US008812949B2

(12) United States Patent
Sandhaus (10) Patent No.: US 8,812,949 B2
(45) Date of Patent: *Aug. 19, 2014

(54) SYSTEM AND METHOD FOR AUTOMATICALLY DETECTING AND EXTRACTING SEMANTICALLY SIGNIFICANT TEXT FROM A HTML DOCUMENT ASSOCIATED WITH A PLURALITY OF HTML DOCUMENTS

(75) Inventor: Evan Stapleton Sandhaus, Brooklyn, NY (US)

(73) Assignee: The New York Times Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,337

(22) Filed: Sep. 23, 2011

(65) Prior Publication Data
US 2012/0254726 A1    Oct. 4, 2012

Related U.S. Application Data

(63) Continuation of application No. 11/734,467, filed on Apr. 12, 2007, now Pat. No. 8,051,372.

(51) Int. Cl.
*G06F 17/30* (2006.01)
(52) U.S. Cl.
CPC ............................... *G06F 17/30911* (2013.01)
USPC ............................. 715/234; 707/728; 707/755
(58) Field of Classification Search
CPC .................... G06F 17/30625; G06F 17/30286
USPC .................... 715/234, 853; 707/728
See application file for complete search history.

(56) References Cited

U.S. PATENT DOCUMENTS

| 4,829,445 | A  | * | 5/1989  | Burney .......................... 700/230 |
| 5,625,748 | A  | * | 4/1997  | McDonough et al. ......... 704/251 |
| 6,631,373 | B1 | * | 10/2003 | Otani et al. ............................ 1/1 |
| 6,751,606 | B1 | * | 6/2004  | Fries et al. ............................. 1/1 |
| 6,775,677 | B1 | * | 8/2004  | Ando et al. .................... 707/739 |
| 6,965,900 | B2 |   | 11/2005 | Srinivasa et al. |
| 7,073,122 | B1 | * | 7/2006  | Sedghi .......................... 715/234 |
| 8,051,372 | B1 | * | 11/2011 | Sandhaus ...................... 715/234 |
| 2001/0056445 | A1 | * | 12/2001 | Meystel et al. ............... 707/513 |
| 2003/0063134 | A1 |   | 4/2003  | Lord et al. |
| 2003/0115188 | A1 | * | 6/2003  | Srinivasa et al. .................. 707/3 |
| 2004/0029085 | A1 |   | 2/2004  | Hu et al. |
| 2004/0260683 | A1 | * | 12/2004 | Chan et al. ......................... 707/3 |
| 2005/0038785 | A1 | * | 2/2005  | Agrawal et al. .................... 707/6 |
| 2005/0060647 | A1 | * | 3/2005  | Doan et al. .................... 715/514 |
| 2005/0066269 | A1 | * | 3/2005  | Wang et al. ................... 715/513 |
| 2005/0192983 | A1 |   | 9/2005  | Hattori et al. |
| 2005/0216443 | A1 |   | 9/2005  | Morton et al. |
| 2006/0047649 | A1 |   | 3/2006  | Liang |
| 2007/0033188 | A1 | * | 2/2007  | Levy et al. ........................ 707/7 |
| 2007/0073758 | A1 | * | 3/2007  | Perry et al. .................... 707/102 |
| 2007/0265996 | A1 | * | 11/2007 | Odom et al. ...................... 707/1 |
| 2008/0059348 | A1 | * | 3/2008  | Glassman et al. ............... 705/35 |
| 2010/0312728 | A1 |   | 12/2010 | Feng et al. |

* cited by examiner

*Primary Examiner* — Stephen S. Hong
*Assistant Examiner* — Ahamed I Nazar
(74) *Attorney, Agent, or Firm* — Rothwell, Figg, Ernst & Manbeck, P.C.

(57) ABSTRACT

A system and method for automatically detecting and extracting semantically significant text from a HTML document associated with a plurality of HTML documents is disclosed. The method may include receiving a HTML document, parsing the HTML document into a parse tree, segmenting the parse tree into one or more segments of one or more unique paths, processing the one or more segments based at least the HTML document, and extracting one or more processed segments from the at least the HTML document based on a predetermined number.

20 Claims, 9 Drawing Sheets

SOURCE CODE — 300

```
<html> — 302
<head> — 304
    <title>    Hello    </title> — 306
<body> — 308
<table> — 310
    <tr>
        <td>
            Foo Bar — 312
        </td>
        <td>
            <img/> — 314
        </td>
    </tr>
</table>
<div> — 316
    <a> New York Times </a>
    <p>
        is the <b> BEST </b>
    </p>
</div>
<div> — 318
    <a> Evan </a> <a> Derek </a> <a> Ron </a>   — 320
</div>
</body>
</html>
```

| | | | | | |
|---|---|---|---|---|---|
| 1 | <HTML> | <HEAD> | <TITLE> | Hello | |
| 2 | <HTML> | <BODY> | <TABLE> | <TR> | <TD> | Foo Bar |
| 3 | <HTML> | <BODY> | <DIV> | <A> | New York Times |
| 4 | <HTML> | <BODY> | <DIV> | <P> | is the |
| 5 | <HTML> | <BODY> | <DIV> | <P> | <B> | best |

| PATH | | | | DOCUMENT FREQUENCY |
|---|---|---|---|---|
| <HTML> <HEAD> <TITLE> #TEXT | | | | 0.0327% |
| <HTML> <BODY> <TABLE> <TR> <TD> #TEXT | | | | 5.278% |
| <HTML> <BODY> <DIV> <A> #TEXT | | | | 3.72% |
| <HTML> <BODY> <DIV> <DIV> <P> #TEXT | | | | 97.025% |
| <HTML> <BODY> <DIV> <P> <B> #TEXT | | | | 23.223% |

SYSTEM AND METHOD FOR AUTOMATICALLY DETECTING AND EXTRACTING SEMANTICALLY SIGNIFICANT TEXT FROM A HTML DOCUMENT ASSOCIATED WITH A PLURALITY OF HTML DOCUMENTS

CROSS REFERENCE TO RELATED APPLICATIONS

This application is a continuation of U.S. patent application Ser. No. 11/734,467, filed Apr. 12, 2007.

FIELD OF THE INVENTION

The present invention relates to systems and methods for automatically detecting and extracting semantically significant text from a HyperText Markup Language ("HTML") document associated with a plurality of HTML documents.

BACKGROUND OF THE INVENTION

In general, only a small portion of the text on a web page may have any relevance in indicating the overall content of that web page. This small portion of meaningful text may be surrounded by headers, footers, navigation elements, advertisements, and other irrelevant text. Though this irrelevant text may be useful to a human reader, it may be problematic for search engines attempting to sift through large amounts of web pages to find those web pages that may be the most relevant. More specifically, the existence of irrelevant text in a web page may increase the likelihood that a search engine will return irrelevant web pages. For example, a query for the term "business" may match an irrelevant web page from www.nytimes.com because it contains the term "business" in a navigation element.

Such false positives may lead to a decrease in the search quality of a search engine. Furthermore, these false positives may lead to inferior user experience with a search engine.

SUMMARY OF THE INVENTION

Accordingly, at least one exemplary embodiment may provide a computer-implemented method for automatically detecting and extracting semantically significant text from a hypertext markup language (HTML) document. This embodiment may comprise receiving a HTML document, parsing the HTML document into a parse tree, segmenting the parse tree into one or more segments of one or more unique paths, processing the one or more segments based on at least the HTML document, and extracting one or more processed segments from at least the HTML document based on a predetermined number.

Another embodiment according to this invention may provide a system for automatically detecting and extracting semantically significant text from a hypertext markup language (HTML) document. This embodiment may comprise a parser module to receive a HTML document and parse the HTML document into a parse tree, a segmenter module to segment the parse tree into one or more segments of one or more unique paths, a processor module to process the one or more segments based at least the HTML document, and an extractor module to extract one or more processed segments from at least the HTML document based on a predetermined number.

An additional embodiment according to this invention may provide a computer-accessible medium encoded with computer program code. The computer-accessible medium according to this embodiment may be effective to perform the following: receive a HTML document and parse the HTML document into a parse tree, segment the parse tree into one or more segments of one or more unique paths, process the one or more segments based on at least the HTML document, and extract one or more processed segments from at least the HTML based on a predetermined number.

These and other embodiments and advantages of the present invention will become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving systems and methods for automatically detecting and extracting semantically significant text from a HTML document associated with a plurality of HTML documents. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

According to various examples, a web page may include an HyperText Markup Language ("HTML") document, an Extensible Markup Language ("XML") document, an Extensible HyperText Markup Language ("XHTML") document, and/or any other document written using a markup language.

For the purpose of providing a non-limiting example, systems and methods disclosed herein make reference to HTML and further, HTML documents. It should be known to one of ordinary skill in the art that the systems and methods disclosed herein may function on any document written using a markup language.

HTML may provide a way to describe the structure of text-based information in a document, by denoting certain text as headings, paragraphs, lists, and other forms of textual structures. HTML may also supplement the text with interactive forms, embedded images, and other objects. HTML documents may contain source text written in the form of labels, known as HTML tags, which may be surrounded by less than (<) and greater than (>) symbols. For example, <DIV> may indicate a division HTML tag, while <TABLE> may indicate a table HTML tag.

HTML documents may include small portions of significant text, as well as, large portions of insignificant text which may be referred to herein as template text. Template text may include, for example, headers, footers, navigation, and advertisements. Though template text may provide a human-reader of a web page with useful information, for example, it may cause a decrease in the efficiency of locating relevant HTML documents included in a web site. For instance, terms in the template text of an HTML document may match terms in a query, even though the general topic of the HTML document may not have any relevance to that query. Accordingly, the template text contained in an HTML document may be reduced by the systems and methods disclosed herein.

By way of a non-limiting example, a search engine (e.g., local search engine) associated with a local server, e.g., a server that may only search HTML documents associated with the local server, may include an index of numerous (e.g., thousands) of associated HTML documents, which may be referred to as web sites. Even further, each of these web sites may include numerous (e.g., hundreds) of HTML documents. If, for example, one, some, or all of the HTML documents associated with the local search engine contain large amounts of template text, the probability of the local search engine returning mostly relevant HTML documents from a given query may be decreased. More specifically, the amount of template text in HTML documents may indicate the amount of probability that false positives may be returned from a local search engine query. As referred to herein, a false positive may refer to the return of an irrelevant HTML document as a result of a query to a local engine.

Figure 1:
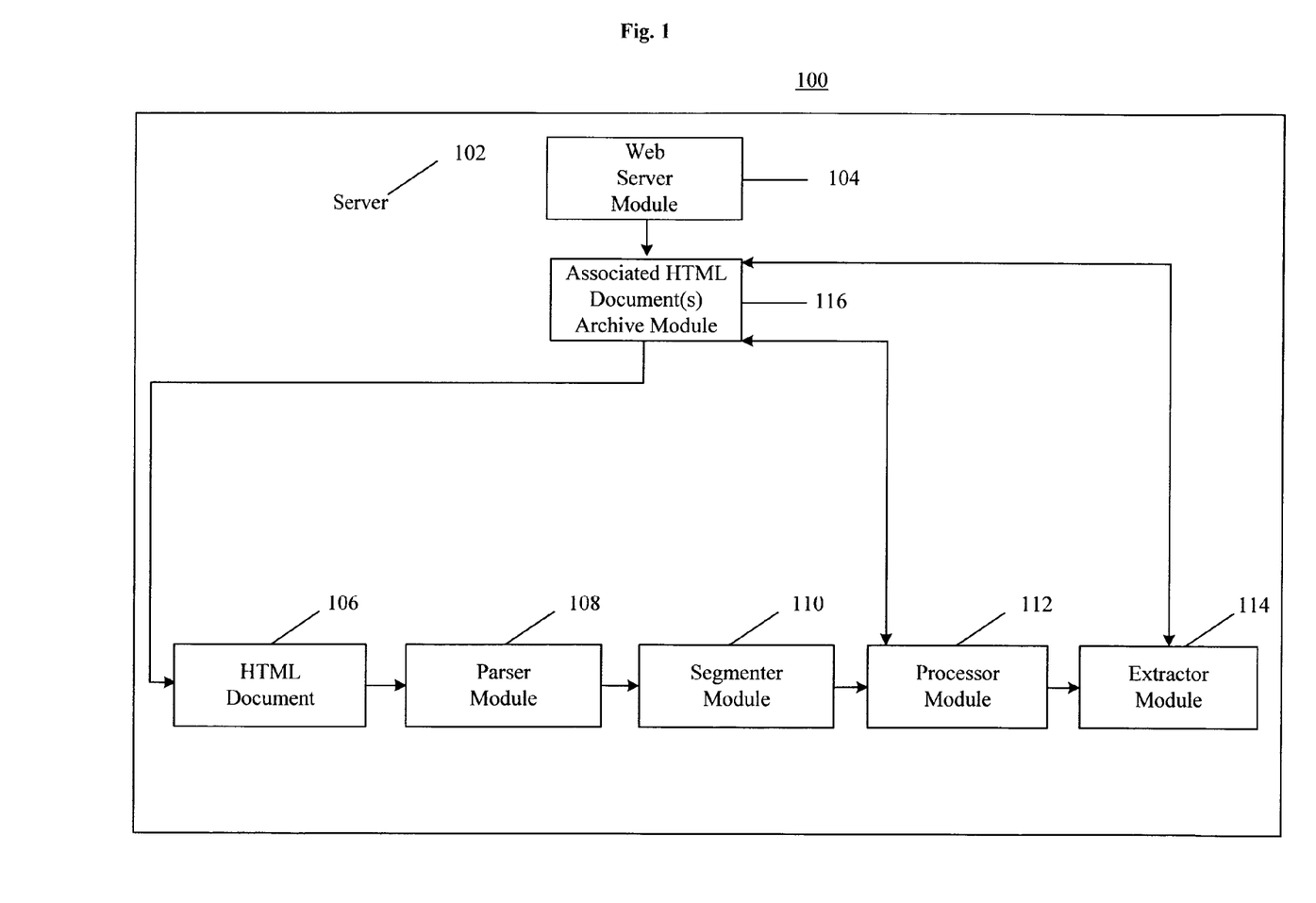
FIG. 1 depicts a block diagram of a system for automatically detecting and extracting semantically significant text from one or more HTML documents associated with a plurality of HTML documents according to at least one embodiment of the disclosure.

Referring now to FIG. 1, a block diagram of a system 100 for automatically detecting and extracting semantically significant text from one or more HTML documents associated with a plurality of HTML documents according to at least one embodiment of the disclosure is depicted. System 100 may include a server 102, a web server module 104, an associated HTML document(s) archive module 116 (which may transmit one or more HTML documents 106), a parser module 108, a segmenter module 110, a processor module 112, and an extractor module 114. In various exemplary embodiments, server 102, web server module 104, associated HTML document(s) archive module 116, parser module 108, segmenter module 110, processor module 112, and extractor module 114 may stand alone and may communicate with each other using a communication network.

Server 102 may include any server known to one of ordinary skill in the art. For example, server 102 may include any combination of software and/or hardware which may be used to provide services to other computer systems, for example, clients, over a computer network. Server 102 may include web server module 104, associated HTML document(s) archive module 116 (which may transmit one or more HTML documents 106), parser module 108, segmenter module 110, processor module 112, and extractor module 114. Web server module 104, associated HTML document(s) archive module 116, parser module 108, segmenter module 110, processor module 112, and extractor module 114 may not reside on server 102, but instead may be physically and/or logically separated and may be connected by a communication network (not shown).

The communication network may include an analog telephone network, a digital telephone network, a public wide area network (WAN) like the Internet, or, different connections, such as, combinations of public and private WANs, local areas networks (LANs), wireless LANs, encrypted networks, body area networks, or other wired or wireless network.

Web server module 104 may include any web-based server known to one of ordinary skill in the art. For example, web server module 104 may include any combination of software and/or hardware which may be used to accept HyperText Transfer Protocol ("HTTP") requests from clients, such as web browsers, and return HTTP responses, such as HTML documents. Web server module 104 may also include any combination of software and/or hardware which may be used to accept programmatic HTTP requests from clients and return HTTP responses, such as HTML documents. In various embodiments, programmatic HTTP requests may include using JAVA programming language to create a JAVA software program, such as, for example a web spider, that may be used to retrieve HTTP documents from web server module 104.

As shown in FIG. 1, a plurality of associated HTML documents may be retrieved from web server 104 and transmitted to associated HTML document(s) archive module 116. For example, retrieving a plurality of associated HTML documents from web server 104 may include using a web spider. In various embodiments, a web spider may include a software program which may be used to browse the World Wide Web in a methodical and automated manner.

Associated HTML document(s) archive module 116 may include any combination of software and/or hardware which may be used to store a plurality of associated HTML documents. Associated HTML document(s) archive module 116 may also include a plurality of associated HTML documents.

Each HTML document and/or the plurality of HTML documents may include a hierarchical structure. More specifically, a HTML document 106 may be represented by a parse tree. A parse tree may be a syntax tree that may represent the syntactic structure of a string of characters based on HTML. A parse tree may include nodes and branches. More specifically, a parse tree may include root nodes, branch nodes, and leaf nodes. A root node may be one which has at least one other node linked by a branch under the root node. A branch node may be one which has one other node linked by a branch over the branch node and which has at least one other node linked by a branch under the branch node. A leaf node may be one which only has a node linked by a branch over the leaf node. In various embodiments a leaf node may include a text node. Associated HTML document(s) archive module 116 may transmit a HTML document 106 to parser module 108.

Parser module 108 may include software and/or hardware for parsing one or more HTML documents 106. Upon receiving a HTML document 106 that may be associated with a plurality of HTML documents, parser module 108 may parse HTML document 106 into a parse tree.

For example, parser module 108 may receive a HTML document 106 that contains a <HTML> HTML tag, a <HEAD> HTML tag, and a <BODY> HTML tag. Based on the HTML syntax structure, the parser module 108 may parse the HTML document 106 into one <HTML> root node with two sub trees including sub tree root nodes <HEAD> and <BODY>.

Parser module 108 may also delete one or more division (<DIV>) HTML tags that may be the root node of a sub tree that may contain an amount of text in associated text nodes, which may include text associated with HTML links, such as link text, that may be greater than a threshold amount from the parse tree and associated sub tree(s). Parser module 108 may also delete one or more table (<TABLE>) HTML tags that may be the root node of a sub tree that may contain an amount of text in associated text nodes, which may include link text, that may be greater than a threshold amount from the parse tree and associated sub tree(s). In various embodiments, the threshold amount may include a threshold amount that may be specified by a user of system 100. Accordingly, parser module 108 may output the trimmed parse tree to segmenter module 110.

Segmenter module 110 may include software and/or hardware for segmenting the trimmed parse tree. Segmenter module 110 may receive the trimmed parse tree as input. Segmenter module 110 may also segment the trimmed parse tree into a set of one or more segments of unique paths from the root node to a leaf node, which may be a text node. Segmenter module 110 may also output a set of one or more segments that may include all of the unique paths from the root node to a text node to processor module 112.

Processor module 112 may include software and/or hardware for processing the set of one or more segments. Processor module 112 may receive the set of one or more segments as input. Processor module 112 may also retrieve all other HTML documents associated with the initial HTML document 106. Retrieving the HTML documents associated with the initial HTML document 106 may include using a JAVA program to access associated HTML document(s) archive module 116. Upon retrieving all other associated HTML documents from associated HTML document(s) archive module 116, processor module 112 may receive the requested HTML documents as input.

Processor module 112 may calculate for each inputted segment a specified the HTML document frequency percentage. The HTML document frequency percentage may include the percentage of HTML documents in which the segment appears.

Processor module 112 may calculate the HTML document frequency percentage by counting all associated HTML documents. For example, this may include processor module 112 incrementing a general counter every time an HTML document is received as input. Further, processor module 112 may assign additional counters to each of the one or more segments received as input.

Every time processor module 112 locates a match to any of the segments within one of the HTML documents, for example, the counter assigned to that segment may be incremented. The processor module 112 may divide each of the outputs of each of the counters assigned to a segment by the output of the general counter to calculate the HTML document frequency percentages for all of the one or more segments received as input. Segments with HTML document frequency percentages greater than a predetermined number, such as, for example, a specified minimum frequency, may be flagged as template text. In various embodiments, the predetermined number may be specified by a user of system 100.

Processor module 112 may output the set of one or more segments that may be flagged as template text to the extractor module 114.

Extractor module 114 may include software and/or hardware for extracting one or more segments flagged as template text from all of the HTML documents. Extractor module 114 may receive the set of one or more segments that may be flagged as template text as input. Extractor module 114 may also retrieve all other HTML documents associated with the initial HTML document 106 from associated HTML documents archive module 116. Extractor module 114 may iterate through each of the associated HTML documents and delete all segments that may be flagged as template text. This may include extractor module 114 scanning each HTML document to locate matches to segments that may be flagged as template text. Accordingly, extractor module 114 may contain all associated HTML documents that may not display template text. More specifically, extractor module 114 may contain all associated HTML documents that may only display the portions of the HTML document that may be determined to be significant text.

Figure 2:
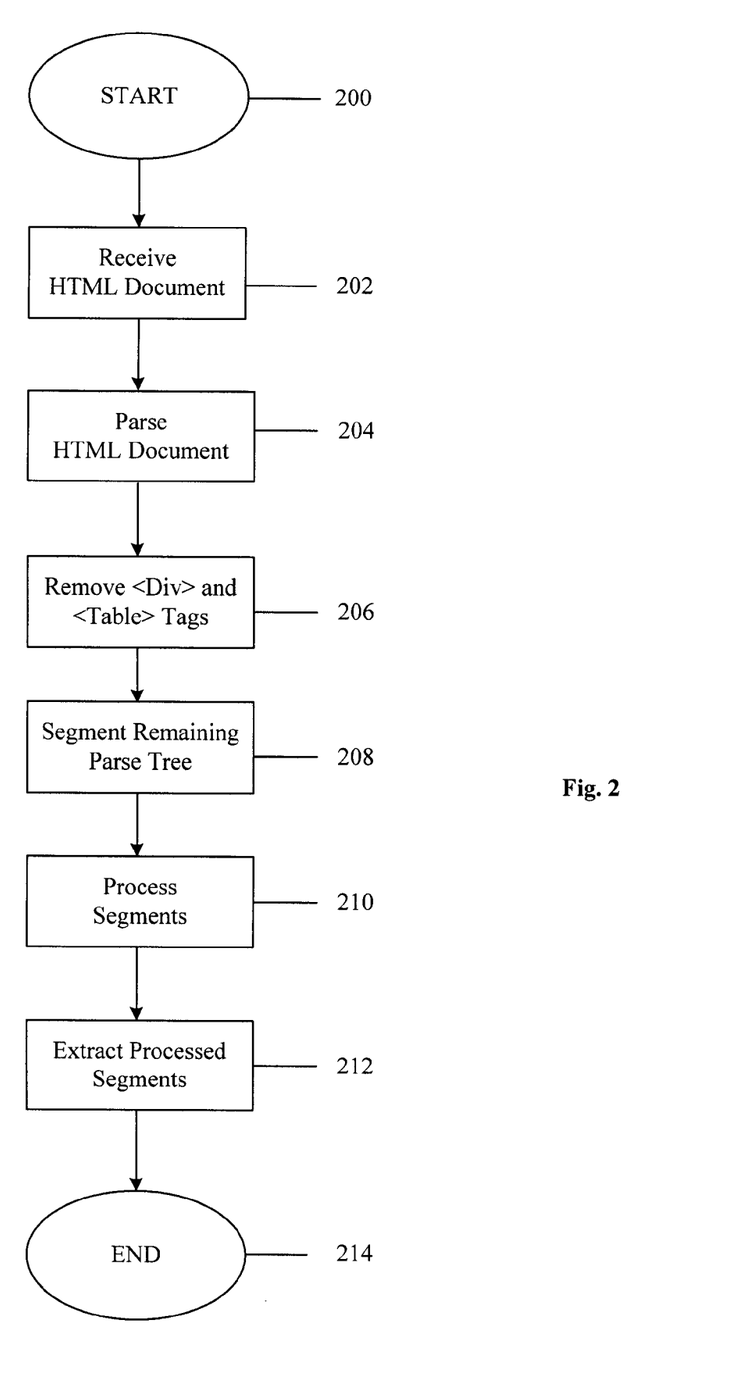
FIG. 2 depicts an exemplary flow chart illustrating a method for automatically detecting and extracting semantically significant text from one or more HTML documents associated with a plurality of HTML documents according to at least one embodiment of the disclosure.

Referring now to FIG. 2, an exemplary flow chart illustrating a method for automatically detecting and extracting semantically significant text from one or more HTML documents associated with a plurality of HTML documents according to at least one embodiment of the disclosure is depicted. The method may be initiated in block 200. In block 202, the parser module may receive an HTML document from the associated HTML documents) archive module. In an exemplary embodiment, the parser module may receive the HTML document from the associated HTML document(s) archive module via a communication network.

Upon receiving the HTML document from the associated HTML document(s) archive module, the parser module may parse the HTML document into a parse tree using parsing software in block 204. Parsing software may include any software for parsing HTML documents into parse trees.

In block 206, the parser module may delete all <DIV> HTML tags and sub trees associated with the <DIV> HTML tags that may be the root node of a sub tree that may contain an amount of text in associated text nodes, which may include link text, that may be greater than a threshold amount from the parse tree and associated subtree(s). Furthermore, the parser module may also delete all <TABLE> HTML tags and sub trees associated with the <TABLE> HTML tags that may be the root node of a sub tree that may contain an amount of text in associated text nodes, which may include link text, that may be greater than a threshold amount from the parse tree and associated subtree(s) in block 206. Accordingly, the parser module may scan for sub trees associated with a <DIV> and/or <TABLE> root node and may delete sub trees that may contain a substantial amount of link text.

For example, the parser module may scan the parse tree from the root node to each unique path that ends with a text node. Scanning the parse tree may include, for example, the parser module traversing from the root node to each linked branch node until a text node may be found. Upon finding a text node, the parser module may increment a total length of text amount variable by the length of text amount associated with that text node and may determine whether the text node includes link text. If, for example, the text node includes link text, the parser module may increment a total length of link text amount variable associated with that text node. In various embodiments, incrementing by a length of text amount may include scanning text and determining the length of a character string.

After the parser module scans an entire sub tree, the parser module may calculate the ratio of the total length of link text amount to the total length of text amount for each sub tree. The parser module may also delete sub trees that contain an amount of link text greater than the threshold.

In block 208, the segmenter module may receive the trimmed parse tree as input. The segmenter module may segment the trimmed parse tree into a set of one or more segments of unique paths from the root node to a text node. Segmenting may include, for example, scanning the trimmed parse tree from the root node to each branch node linked to the root node to each branch node linked to those branch nodes until a text node is located. Once a text node is located, the segmenter may assign a segment number, for example, segment number 1 or segment number 2, to that segment. If, for example, a text node is not located at the leaf node, the segmenter module may not assign a segment number to that particular segment. Segmenter module may continue this process for each unique path from the root node to a text node until the entire trimmed parse tree has been scanned. Once the entire trimmed parse tree has been scanned for segments by the segmenter module, the segmenter module may output those segments that may have been assigned a segment number.

In block 210, the processor module may receive the segments from the segmenter module as input. The processor module may calculate for each inputted segment the HTML document frequency percentage. Calculating the HTML document frequency percentage for each segment inputted may include, for example, the processor module retrieving and scanning all associated HTML documents. Based on the number of times a particular segment appears in all of the associated HTML documents, the processor module may flag the segment as template text. A larger HTML document frequency percentage, for example percentages greater than or equal to 97%, may indicate a likelihood that segment may be flagged as template text. A smaller HTML document frequency percentage, for example percentages less than 3%, may indicate a likelihood of not being flagged as template text. The threshold value for frequency percentage may be adjusted according to numerous factors regarding whether a segment contains template text.

For example, if the processor module calculates the HTML document frequency percentage for a particular segment to be greater than 3%, such as 24%, there may be a high probability that the text in the leaf node of that segment may be insignificant template text, such as link text, that may not be relevant to the overall topic of the HTML documents because of its repeated appearances. If, however, processor module calculates the HTML document frequency percentage for a particular segment to be less than 3%, such as 1.3%, there may be a high probability that the text in the leaf node of that segment is significant to the overall topic of the HTML documents because of its few appearances. Processor module may output the set of one or more segments that may be flagged as template text to the extractor module.

In block 212, the extractor module may receive the template text segments as input. Extractor module may also retrieve all other HTML documents associated with the initial HTML document from the associated HTML document(s) archive module in block 212. Further in block 212, extractor module may iterate through each associated HTML document and delete all segments that were flagged as template text. The extractor module may output HTML documents that only contain text that is significant to the overall topic of the HTML documents. In block 214, the method may end.

FIG. 3 through FIG. 8 depict an exemplary illustration of a system and method for automatically detecting and extracting semantically significant text from an HTML document associated with a plurality of HTML documents according to at least one embodiment of the disclosure. It should be known to one of ordinary skill in the art that these examples are not an indication of limitations in the systems and methods disclosed herein.

Figure 3:
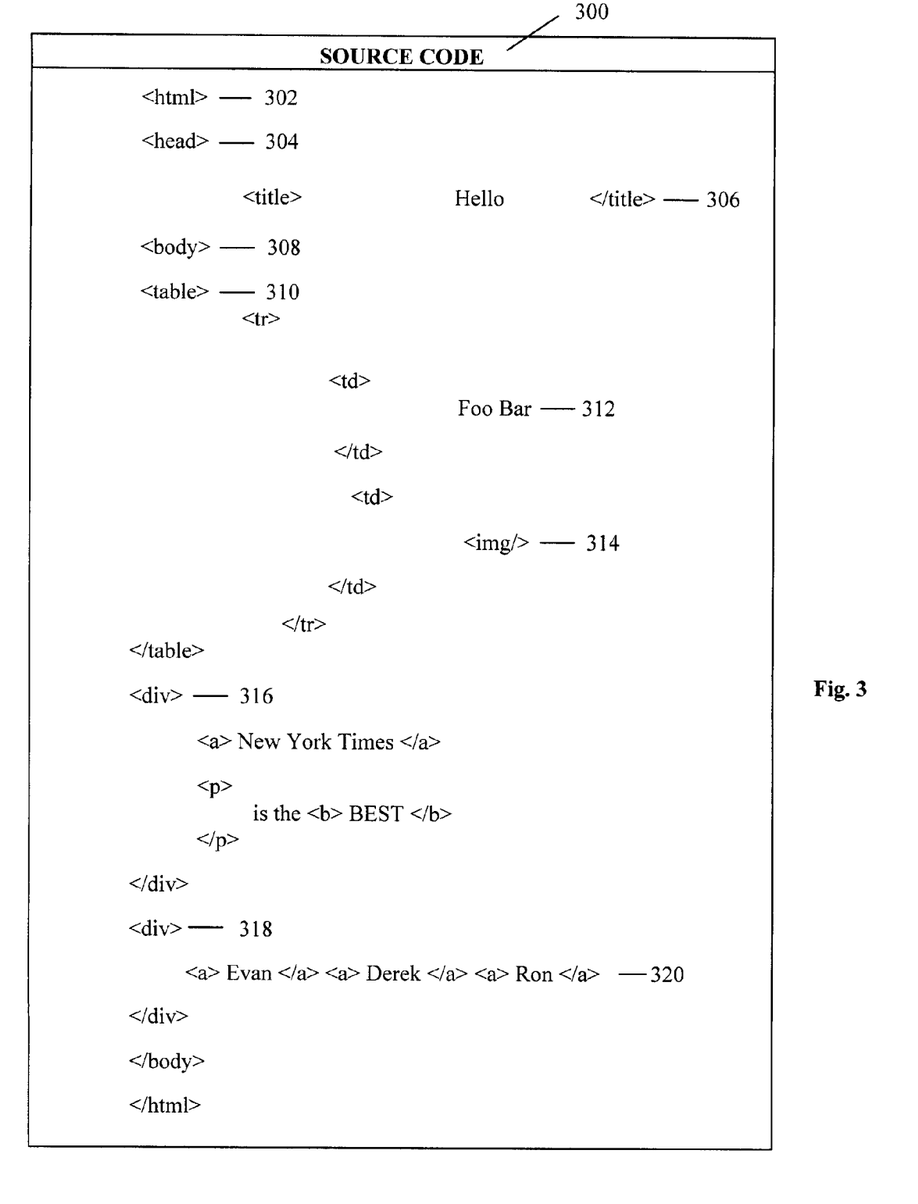
FIG. 3 depicts an exemplary illustration of HTML source text according to at least one embodiment of the disclosure.

Referring now to FIG. 3, an exemplary illustration of a HTML source text file 300 according to at least one embodiment of the disclosure is depicted. HTML source text may include the original text used to design and configure the HTML document. For example, HTML source text may include an <HTML> HTML tag 302 at the top of the source text file 300. The HTML source text may further include HTML tags such as <HEAD> 304 and <BODY> 308.

The <HEAD> HTML tag 304 may include subsections such as <TITLE> with text such as "Hello" 306. The <BODY> HTML tag 308 may include a <TABLE> HTML tag 310 and two <DIV> HTML tags 316, and 318. The <TABLE> HTML tag 310 may include subsections with text such as "FooBar" 312 and non-text such as an <IMG/> HTML tag 314 which may indicate an embedded image. The first <DIV> HTML tag 316 may include subsections with text. The second <DIV> HTML tag 318 may include subsections with all link text, such as embedded links 320.

The parser module may receive an HTML document from the associated HTML document(s) archive module that may contain this HTML source text. Based on the syntactic structure of the HTML document, the parser module may use parsing software to then parse the HTML document into a parse tree.

Figure 4:
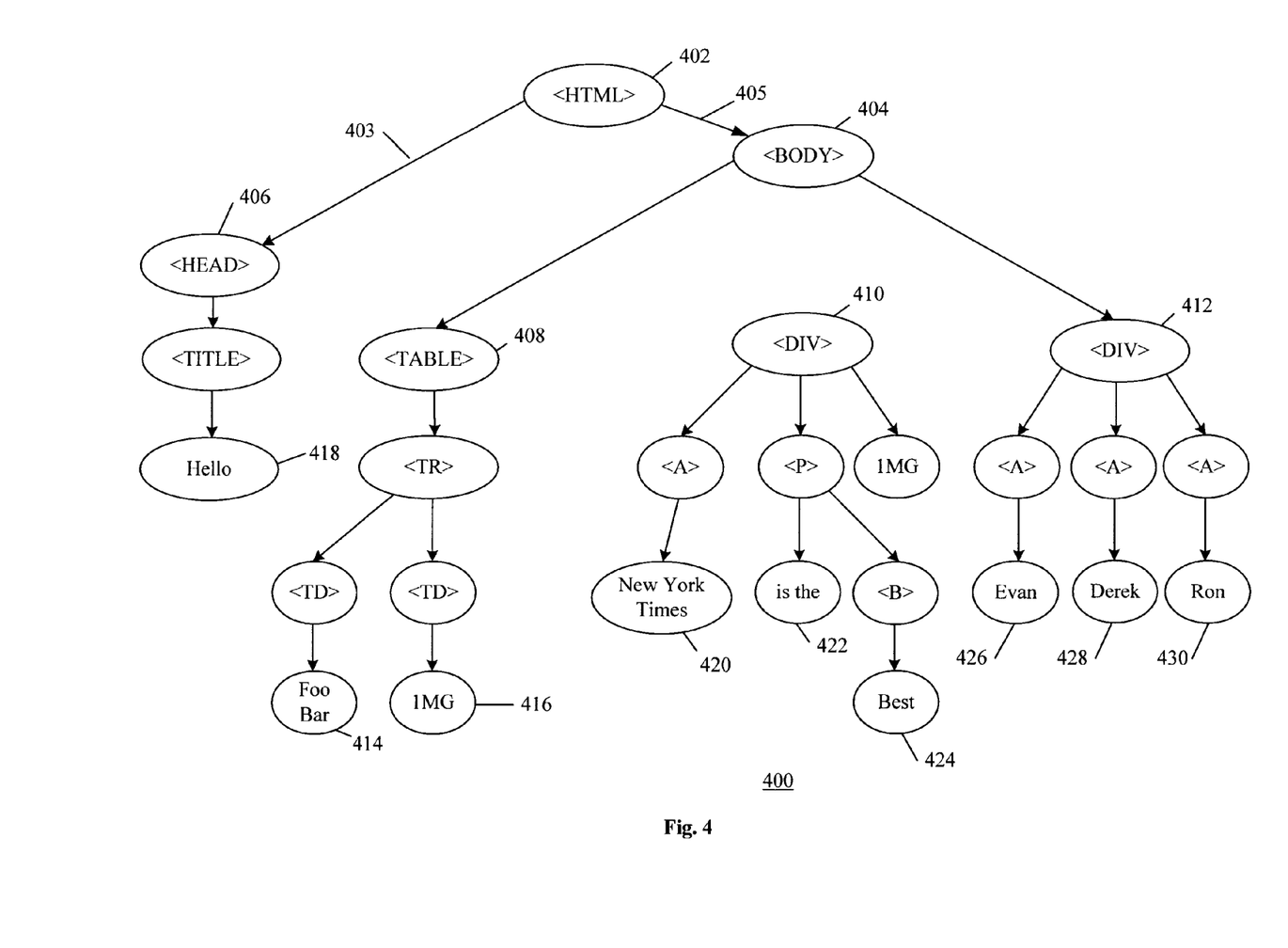
FIG. 4 depicts an exemplary illustration of a parse tree derived from the HTML source text illustrated in FIG. 3 according to at least one embodiment of the disclosure.

Referring now to FIG. 4, an exemplary illustration of a parse tree derived from the HTML source text illustrated in FIG. 3 according to at least one embodiment of the disclosure is depicted. The HTML source text may be parsed into branches and nodes to form a parse tree 400 as shown in FIG. 4. The <HTML> HTML tag may include root node 402 of parse tree 400. The <HEAD> HTML tag branch node 406 and the <BODY> HTML tag branch node 404 may be linked to root node 402 by branches 403 and 405, respectively.

The <HEAD> HTML tag branch node 406 may be linked to additional branch nodes until the path ends at a leaf node 418. The leaf node 418 may include a text node that contains the text "Hello."

The <BODY> HTML tag branch node 404 may be linked to three branch nodes including <TABLE> HTML tag branch node 408, <DIV> HTML tag branch node 410, and <DIV> HTML tag branch node 412. These branch nodes 408, 410, and 412 may also include the root nodes of each of their respective sub trees. The <TABLE> HTML tag branch node 408 may be linked to additional branch nodes until the path ends at leaf node 414 or leaf node 416. The leaf node 414 may include a text node that contains the text "FooBar." The <DIV> HTML tag branch node 410 may be linked to additional branch nodes until the path ends at leaf node 420, leaf node 422, or leaf node 424. The leaf nodes 420, 422, and 424 may include text nodes that contain the text "New York Times," "is the," and "Best," respectively. The <DIV> HTML tag branch node 412 may be linked to additional branch nodes until the path ends at leaf node 426, leaf node 428, or leaf node 430. The leaf nodes 426, 428, and 430 may link text, such as "Evan," "Derek," and "Ron," respectively.

As previously discussed, once the parser module has created a parse tree like the one illustrated in FIG. 4, the parser module may begin to trim the parse tree by deleting all <DIV> HTML tags that may be the root node of a sub tree that may contain a substantial amount of link text from the parse tree and associated sub trees. In addition, the parser module may also continue trimming the parse tree by deleting all <TABLE> HTML tags that may be the root node of a sub tree that may contain a substantial amount of link text from the parse tree and associated sub trees.

Figure 5:
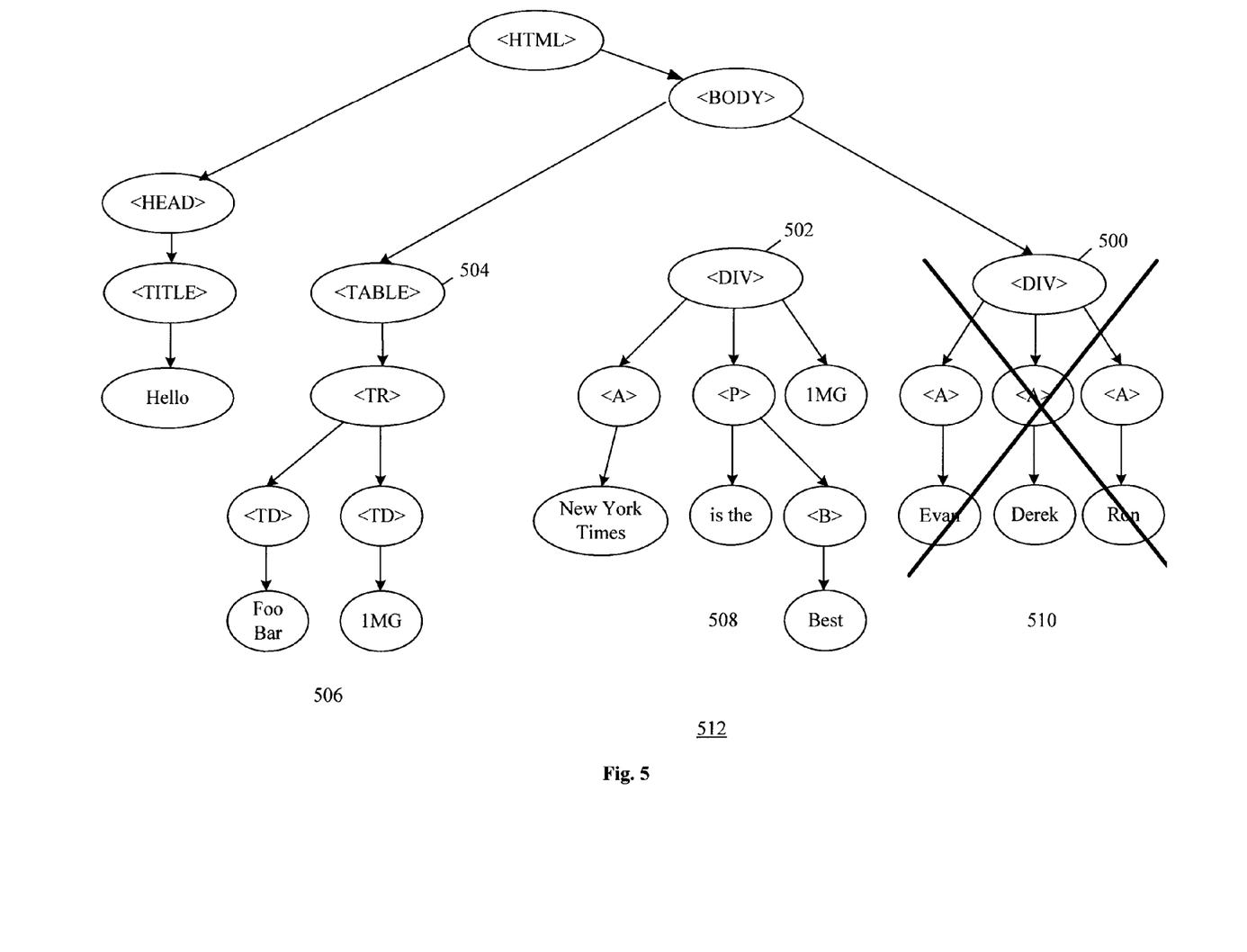
FIG. 5 depicts an exemplary illustration of trimming a parse tree according to at least one embodiment of the disclosure.

Referring now to FIG. 5, an exemplary illustration of trimming a parse tree 512 according to at least one embodiment of the disclosure is depicted. As illustrated, branch nodes 500, 502, and 504 may be the root nodes of sub tree 510, 508, and 506, respectively. Further, nodes 500, 502, and 504 may include <TABLE> HTML tags and <DIV> HTML tags. Accordingly, the parser module may delete any one of sub trees 506, 508, and 510 that may contain a substantial amount of link text. As illustrated, sub tree 510 may only contain text nodes with link text, such as, for example, embedded links, as opposed to text nodes that may not contain link text. Therefore, as indicated by the crossing out of sub tree 510 in FIG. 5, the parser module may delete sub tree 510. The parser module, may not however, delete sub tree 506 or 508 because both contain an amount of link text lower than the threshold amount.

Figure 6:
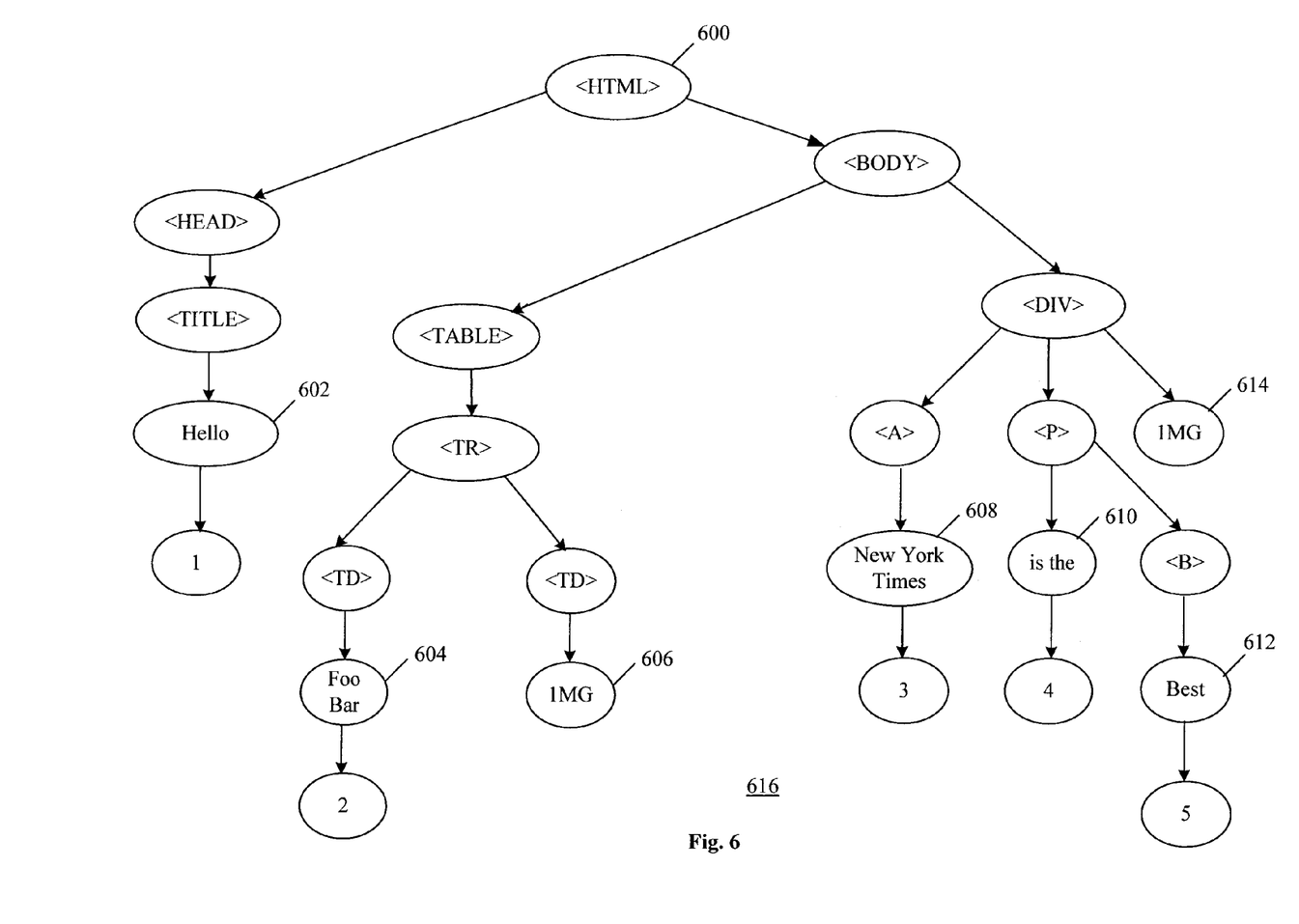
FIG. 6 depicts an exemplary illustration of segmenting a trimmed parse tree according to at least one embodiment of the disclosure.

As previously discussed, the parser module may output a trimmed parse tree 616 as illustrated in FIG. 6. The segmenter module may then receive the trimmed parse tree 616 as input and segment the trimmed parse tree 616 into a set of one or more segments of unique paths from the root node to a text node.

Referring now to FIG. 6, an exemplary illustration of segmenting a trimmed parse tree according to at least one embodiment of the disclosure is depicted. The segmenter module may receive a trimmed parse tree 616 as input. The segmenter module may then scan the trimmed parse tree 616 beginning from root node 600 and ending at each leaf node that may create a unique path. The segmenter module may assign a segment number to each unique path that may end with a text node. For example, the segmenter module may begin at root node 600 and scan down until it reaches leaf node 602. Since leaf node 602 may contain a text such as "Hello," the segmenter module may assign a segment number of one to that unique path. The segmenter module may continue this until it scan all unique paths in an inputted trimmed parse tree 616. As a result, the segmenter module may assign segment number 2, 3, 4, and 5 to text nodes 604, 608, 610, and 612, respectively. Leaf nodes 606 and 614 may not be assigned a segment number by the segment module since they may not contain text nodes. The segmenter module may then out put the segments with assigned segment numbers.

Figure 7:
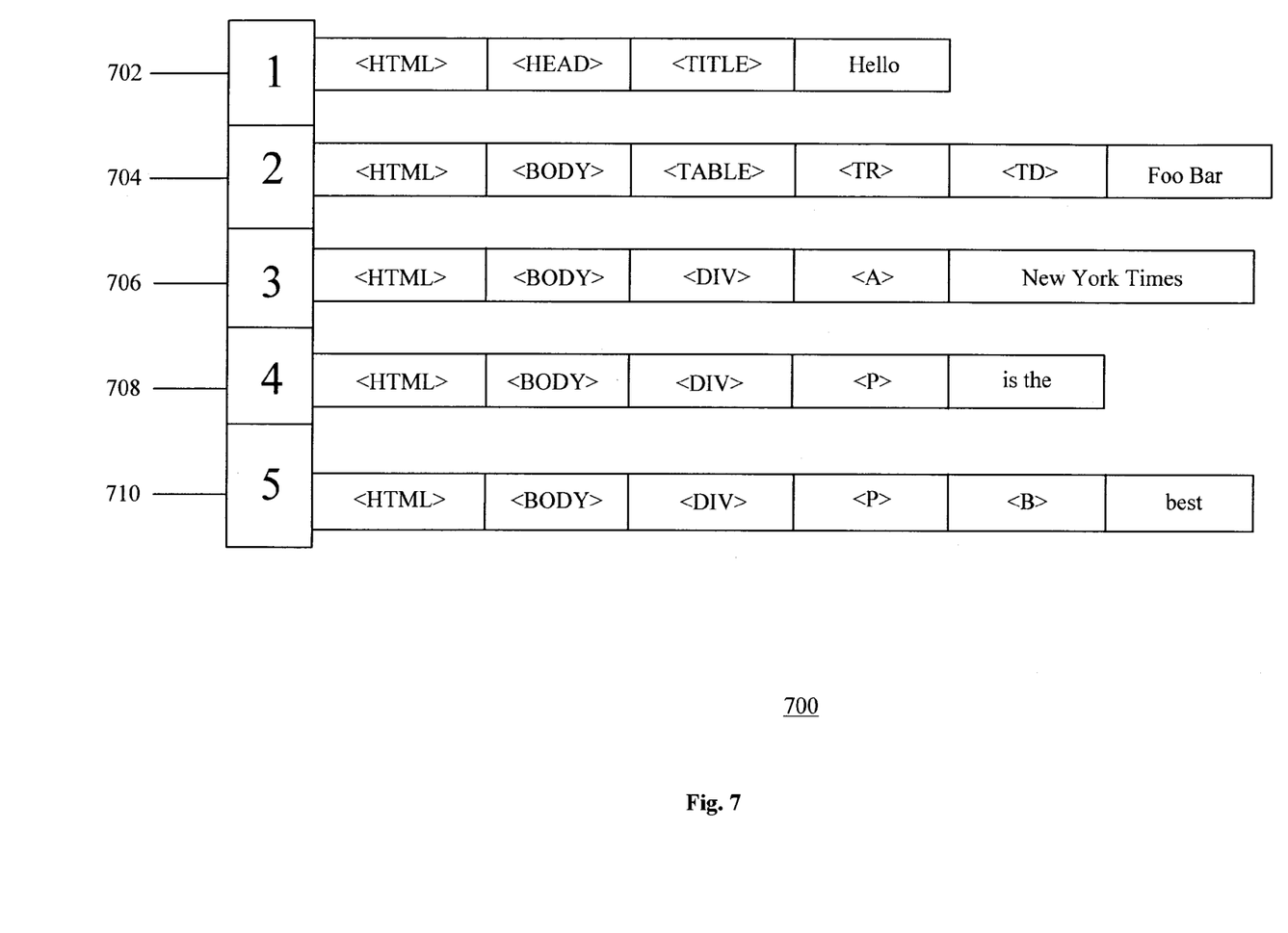
FIG. 7 depicts an exemplary illustration of segments of unique paths according to at least one embodiment of the disclosure.

As previously discussed, the segmenter module may output segments of unique paths 700 that may end with text nodes as illustrated in FIG. 7. The processor module may then receive the segments as input and may calculate the HTML document frequency percentage for each segment received.

Referring now to FIG. 7, an exemplary illustration of segments of unique paths 700 according to at least one embodiment of the disclosure is depicted. As illustrated in FIG. 6, segment numbers 1 through 5 may be assigned to segments of unique paths from the root node to text nodes. As shown in FIG. 7, segment 1 702 may refer to the first unique path that may have ended with a text node that the segmenter module may have scanned.

More specifically, segment 1 702 may begin with the <HTML> HTML tag root node and end with "Hello" text node. Segment 2 704 may begin with the <HTML> HTML tag root node and end with "FooBar" text node. Segment 3 706 may begin with the <HTML> HTML tag root node and end with "New York Times" text node. Segment 4 708 may begin with the <HTML> HTML tag root node and end with "is the" text node. Segment 5 710 may begin with the <HTML> HTML tag root node and end with "Best" text node.

Figure 8:
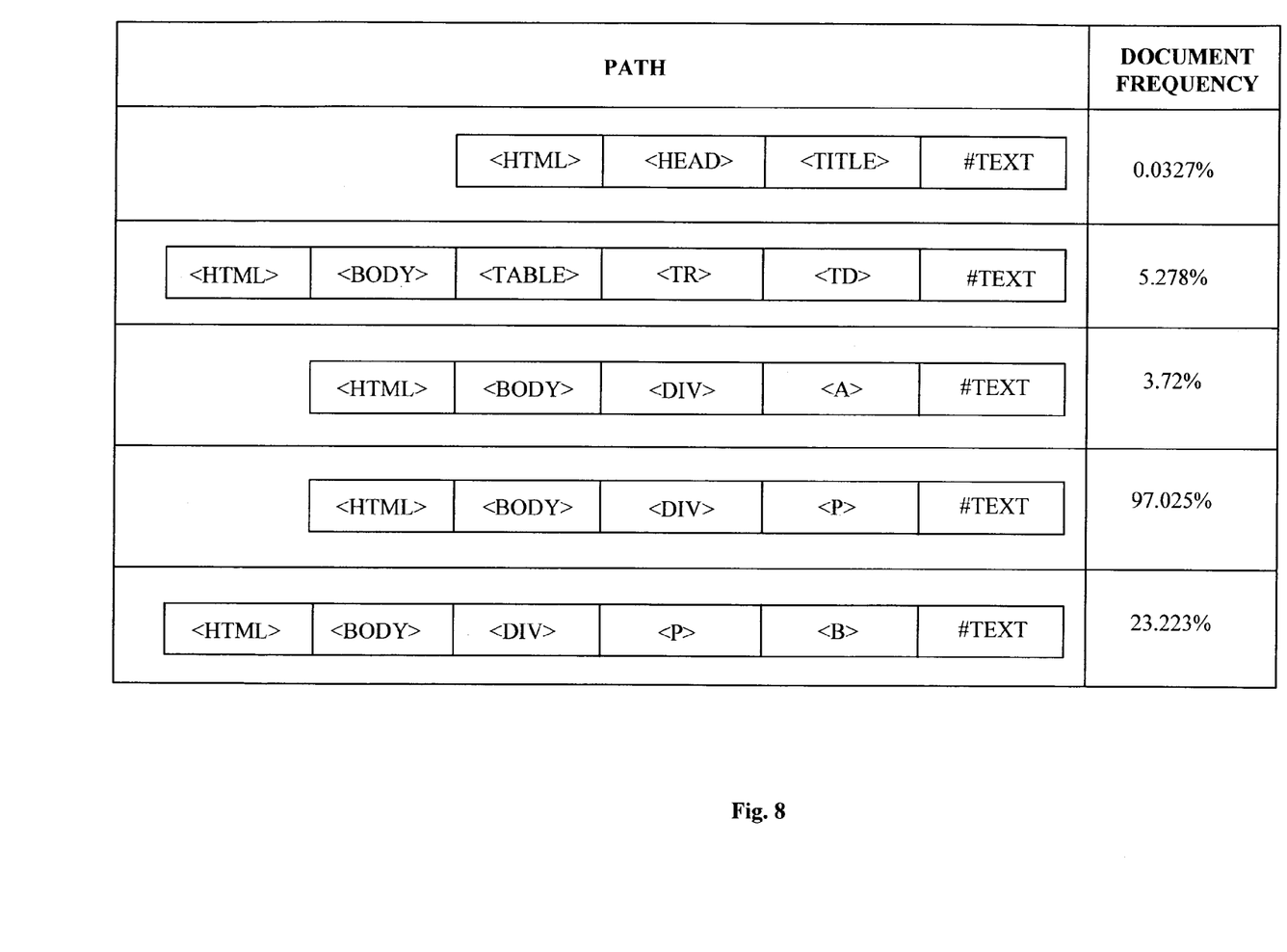
FIG. 8 depicts an exemplary illustration of the results of processing one or more segments according to at least one embodiment of the disclosure.

Referring now to FIG. 8, an exemplary illustration of the results of processing one or more segments according to at least one embodiment of the disclosure is depicted. The processor module may receive the results of FIG. 7 as input. The processor module may then calculate the HTML document frequency percentage for each segment received as input.

The processor module may flag the inputted segments as template text. Accordingly, all segments with a HTML document frequency percentage over a predetermined specified minimum frequency may be flagged as template text. As previously discussed, a large HTML document frequency percentage may indicate a likelihood that segment may be flagged as template text. A small HTML document frequency percentage may indicate a likelihood of not being flagged as template text.

Based on amount of the HTML document frequency percentage illustrated in FIG. 8, it may be likely that the processor module may flag the segments associated with approximately 97.025%, 23.223%, and 5.278% as template text.

The extractor module may receive the segments flagged as template text as input. The extractor module may then iterate through each associated HTML document and delete all segments that were flagged as template text.

Figure 9:
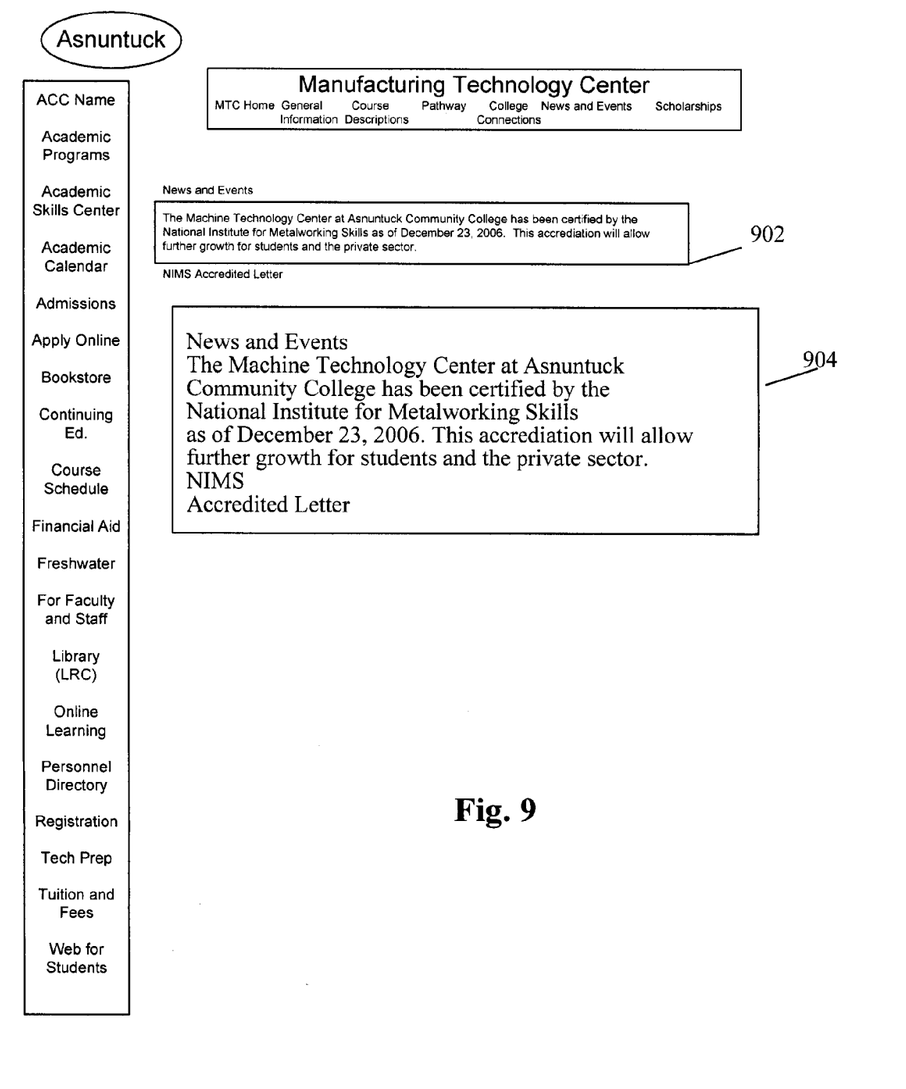
FIG. 9 depicts an exemplary illustration of the results of extracting template text according to at least one embodiment of the disclosure.

FIG. 9 may illustrate the output of the extractor module. Based on the HTML document frequency percentages shown in FIG. 8, the unique paths with an associated HTML document frequency percentage greater than, for example, 3.72% and less than or equal to 97.025%, may be flagged as template text. Therefore, the extractor module may extract the segments of unique paths that may fall in the greater than 3.72% less than 97.025% range. As shown in FIG. 9, the remaining portions of the HTML document may be associated with the unique path <HTML><HEAD><TITLE>#TEXT 902 and <HTML><BODY><DIV><A># TEXT 904.

It should be noted that this depiction is an example of how the present invention may be used. One of ordinary skill in the art may devise other uses for the present invention.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A computer-implemented method for automatically outputting semantically significant text from a markup language document, comprising:
   storing a set of markup language documents, the set of documents including a first markup language document;
   parsing the first markup language document to produce a parse tree;
   segmenting the parse tree into a set of segments including a first segment, each segment included in the set of segments representing a unique path in the parse tree;
   determining the total number of documents included in said set of documents that include said first segment;
   determining the percentage of said documents included in said set of documents that include said first segment based on said determined total number and the total number of documents included in said set of documents;
   determining whether said determined percentage meets or exceeds a threshold; and
   flagging the first segment for search index exclusion in response to determining that the determined percentage meets or exceeds the threshold.

2. The method according to claim 1, wherein the set of markup language documents comprise a plurality of associated HTML documents of a web site.

3. The method according to claim 1, wherein the parsing the markup language document into the parse tree comprises parsing source text associated with the markup language document.

4. The method according to claim 3, wherein the source text comprises HTML tags.

5. The method according to claim 1, wherein the parse tree comprises one or more root nodes, one or more branch nodes, and one or more leaf nodes.

6. The method according to claim 1, wherein the parsing the markup language document into the parse tree further comprises removing one or more markup language tags.

7. The method according to claim 6, wherein the removed markup language tags comprise a division HTML tag or a table HTML tag.

8. The method according to claim 5, wherein the unique path in the parse tree is a path from a root node to a text node of the parse tree.

9. The method according to claim 1, wherein the threshold comprises a specified minimum frequency occurrence of the one or more segments.

10. A system for automatically outputting semantically significant text from a markup language document, comprising:
    a data store storing a set of markup language documents, the set of documents including a first markup language document;
    a parser module to parse the first markup language document to produce a parse tree;
    a segmenter module to segment the parse tree into a set of segments including a first segment each of the segments included in said set of segments representing a unique path in the parse tree; and
    a processor module to:
      determine the total number of documents included in said set of documents that include said first segment;
      determine the percentage of said documents included in said set of documents that include said first segment based on said determined total number and the total number of documents included in said set of documents;
      determine whether said determined percentage meets or exceeds a threshold; and
      flag said first segment for search index exclusion in response to a determination that said determined percentage meets or exceeds the threshold.

11. The system according to claim 10, wherein to parse the markup language document into the parse tree, the parse module parses source text associated with the markup language document.

12. The system according to claim 10, wherein the parse tree comprises one or more root nodes, one or more branch nodes, and one or more leaf nodes.

13. The system according to claim 10, wherein to parse the markup language document into the parse tree, the parse module removes one or more markup language tags.

14. The system according to claim 13, wherein the removed markup language tags comprise a division HTML tag or a table HTML tag.

15. The system according to claim 10, wherein the unique path in the parse tree is a path from a root node to a text node of the parse tree.

16. The system according to claim 10, wherein the threshold comprises a specified minimum frequency occurrence of the one or more segments.

17. A non-transitory computer-readable medium storing computer program code for:
    parsing a first markup language document to produce a parse tree, the first markup language document being included in a set of markup language documents that includes a plurality of markup language documents;
    segmenting the parse tree into a set of segments including a first segment, each segment included in the set of segments representing a unique path in the parse tree;
    determining the total number of documents included in said set of documents that include said first segment;
    determining the percentage of said documents included in said set of documents that include said first segment based on said determined total number and the total number of documents included in said set of documents;
    determining whether said determined percentage meets or exceeds a threshold; and
    flagging the first segment for search index exclusion in response to determining that the determined percentage meets or exceeds the threshold.

18. The method according to claim 1, wherein the parse tree comprises a plurality of sub-trees, the method further comprising trimming the parse tree by removing at least one of the plurality of sub-trees before segmenting the parse tree into one or more segments.

19. The method according to claim 18, wherein the removing the at least one of the plurality of sub-trees comprises determining that the at least one sub-tree has an amount of link text that exceeds a predetermined threshold.

20. The method according to claim 1, wherein:
    said set of documents includes a second markup language document, and
    the method further includes:
    parsing the second markup language document to produce a second parse tree, the second markup language document being included in said set of markup language documents;
    segmenting the second parse tree into a second set of segments;
    determining that said second set of segments includes a segment that matches said first segment that has been flagged for search index exclusion;

in response to determining that said second set of segments includes a segment that matches the first segment that has been flagged for search index exclusion, removing from the second markup language document at least a portion of the segment that matches the first segment; and indexing the second markup language document after removing said at least a portion of said segment from the second markup language document.

* * * * *